(12) United States Patent
Patel et al.

(10) Patent No.: US 11,868,440 B1
(45) Date of Patent: Jan. 9, 2024

(54) STATISTICAL MODEL TRAINING SYSTEMS

(71) Applicant: A9.com, Inc., Palo Alto, CA (US)

(72) Inventors: Yash Patel, Pittsburgh, PA (US); R. Manmatha, San Francisco, CA (US); Alexander Smola, Sunnyvale, CA (US); Son D. Tran, Mountain View, CA (US); Sheng Zha, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 1305 days.

(21) Appl. No.: 16/152,327

(22) Filed: Oct. 4, 2018

(51) Int. Cl.
| | |
|---|---|
| *G06F 16/28* | (2019.01) |
| *G06F 18/21* | (2023.01) |
| *G06T 1/20* | (2006.01) |
| *G06F 17/18* | (2006.01) |
| *G06N 3/04* | (2023.01) |
| *G06F 16/50* | (2019.01) |
| *G06F 18/214* | (2023.01) |

(52) U.S. Cl.
CPC .......... *G06F 18/2193* (2023.01); *G06F 16/50* (2019.01); *G06F 17/18* (2013.01); *G06F 18/2148* (2023.01); *G06N 3/04* (2013.01); *G06T 1/20* (2013.01)

(58) Field of Classification Search
CPC ....... G06K 9/6265; G06F 16/50; G06F 17/18; G06N 3/04; G06T 1/20
See application file for complete search history.

(56) References Cited

U.S. PATENT DOCUMENTS

| | | | | |
|---|---|---|---|---|
| 8,340,945 | B2* | 12/2012 | Natarajan | G06F 17/18 703/2 |
| 9,015,093 | B1* | 4/2015 | Commons | G01C 21/3602 706/26 |
| 9,158,971 | B2* | 10/2015 | Gaidon | G06V 20/40 |
| 10,049,450 | B2* | 8/2018 | Madabhushi | G06N 3/08 |
| 10,380,259 | B2* | 8/2019 | Lee | G06N 5/022 |
| 10,572,979 | B2* | 2/2020 | Vogels | G06F 18/2113 |
| 10,672,109 | B2* | 6/2020 | Vogels | G06T 5/50 |
| 10,699,382 | B2* | 6/2020 | Vogels | G06N 20/00 |
| 10,726,153 | B2* | 7/2020 | Nerurkar | G06F 18/24323 |
| 10,748,066 | B2* | 8/2020 | Ravi | G06N 3/045 |

(Continued)

OTHER PUBLICATIONS

Non-Final Office Action received in U.S. Appl. No. 16/152,333, dated Aug. 5, 2022.

(Continued)

*Primary Examiner* — Philip P. Dang
(74) *Attorney, Agent, or Firm* — Hogan Lovells US LLP

(57) ABSTRACT

Subsets of training data are selected for iterations of a statistical model through a training process. The selection can reduce the amount of data to be processed by selecting the training data that will likely have significant training value for the pass. This can include using a metric such as the loss or certainty to sample the data, such that easy to classify instances are used for training less frequently than harder to classify instances. A cutoff value or threshold can also, or alternatively, be used such that harder to classify instances are not selected for training until later in the process when the model may be more likely to benefit from training on those instances. Sampling can vary between passes for variety, and the cutoff value might also change such that all data instances are eligible for training selection by at least the last iteration.

16 Claims, 11 Drawing Sheets

(56) References Cited

U.S. PATENT DOCUMENTS

| | | | | |
|---|---|---|---|---|
| 10,885,277 | B2* | 1/2021 | Ravi | G06N 3/063 |
| 11,042,811 | B2* | 6/2021 | Rolfe | G06N 10/00 |
| 2006/0056704 | A1 | 3/2006 | Bachmann | |
| 2016/0110657 | A1 | 4/2016 | Gibiansky et al. | |
| 2016/0253597 | A1 | 9/2016 | Bhatt et al. | |
| 2018/0240011 | A1 | 8/2018 | Tan et al. | |
| 2018/0314932 | A1 | 11/2018 | Schwartz et al. | |
| 2018/0336464 | A1* | 11/2018 | Karras | G06N 3/08 |
| 2019/0378010 | A1* | 12/2019 | Morris | G06N 3/04 |

OTHER PUBLICATIONS

Final Office Action received in U.S. Appl. No. 16/152,333, dated Feb. 2, 2023.

Schafer et al., "A Hybrid Logistic Regression/Neural Network Model for the Prediction of Broken Rails", 2008, In: Proceedings of the 8th World Congress on Railway Research, pp. 1-10. (Year: 2008).

Oshchilov et al., "Online Batch Selection for Faster Training of Neural Networks", Apr. 25, 2016, arXiv: 1511.06343v4, pp. 1-20. (Year: 2016).

Zhu et al., "Multi-Criteria-based Strategy to Stop Active Learning for Data Annotation", 2008, Proceedings of the 22nd International Conference on Computational Linguistics (Coling 2008), pp. 1129-1136. (Year: 2008).

Wu et al., "Sampling Matters in Deep Embedding Learning", Jun. 23, 2017, arXiv:1706.07567v1, pp. 1-9. (Year: 2017).

* cited by examiner

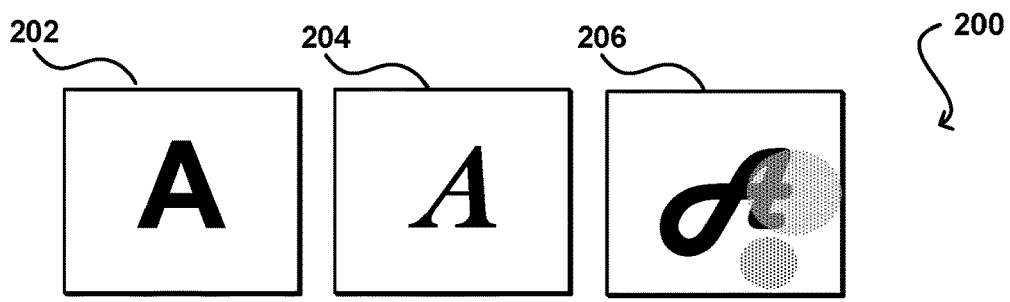
FIG. 2
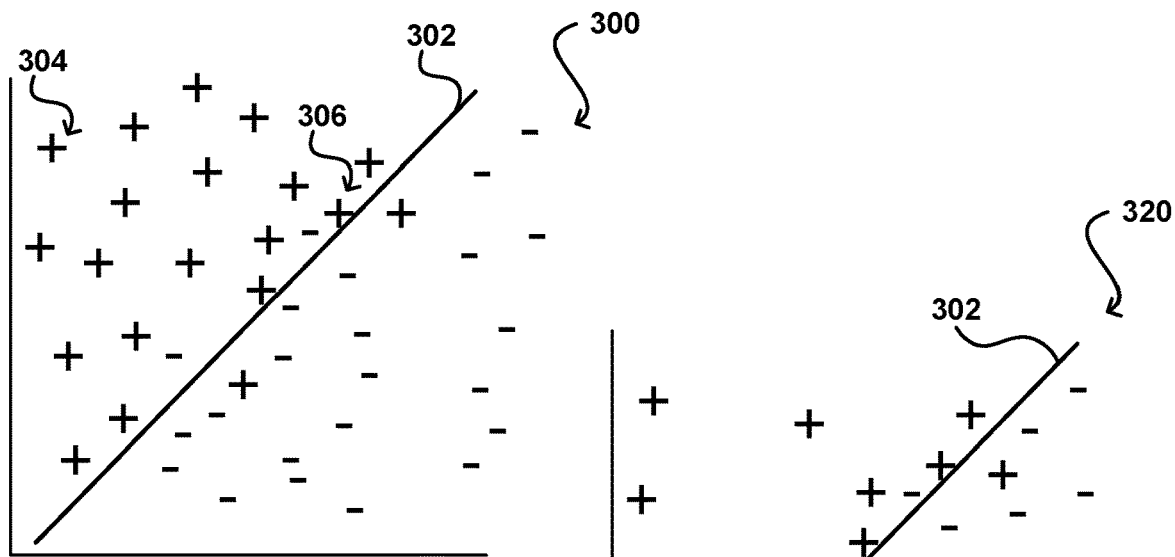
FIG. 3A
FIG. 3B
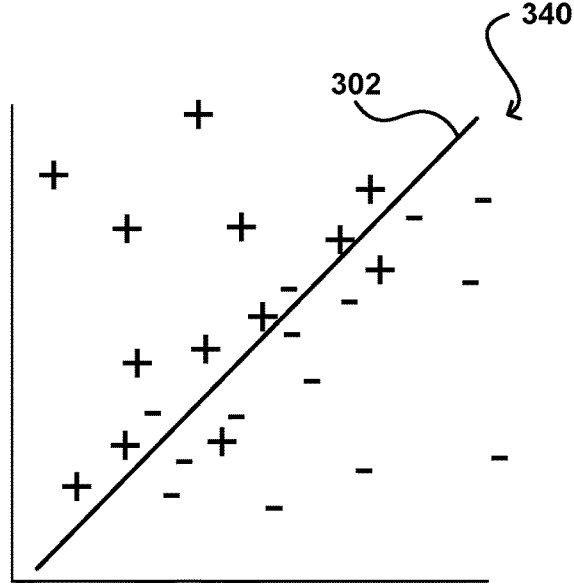
FIG. 3C

US 11,868,440 B1

STATISTICAL MODEL TRAINING SYSTEMS

BACKGROUND

An increasing amount of computer-based processing is being performed using statistical models, such as trained machine learning models. In order for these models to be trained with high accuracy, conventional training processes utilize large data sets with many instances of classified data. The large sizes of these data sets results in a significant cost for a given training process, including costs in terms of resources and time. While certain types of hardware or accelerators have helped to improve the speed at which the training can be performed, the amount of processing has not been reduced, and the cost for these improved resources has increased.

BRIEF DESCRIPTION OF THE DRAWINGS

Various embodiments in accordance with the present disclosure will be described with reference to the drawings, in which:

FIG. 2 illustrates a set of example training images that can be utilized in accordance with various embodiments.

FIGS. 3A, 3B, and 3C illustrate plots of data classifications that can be generated in accordance with various embodiments.

DETAILED DESCRIPTION

Figure 1:
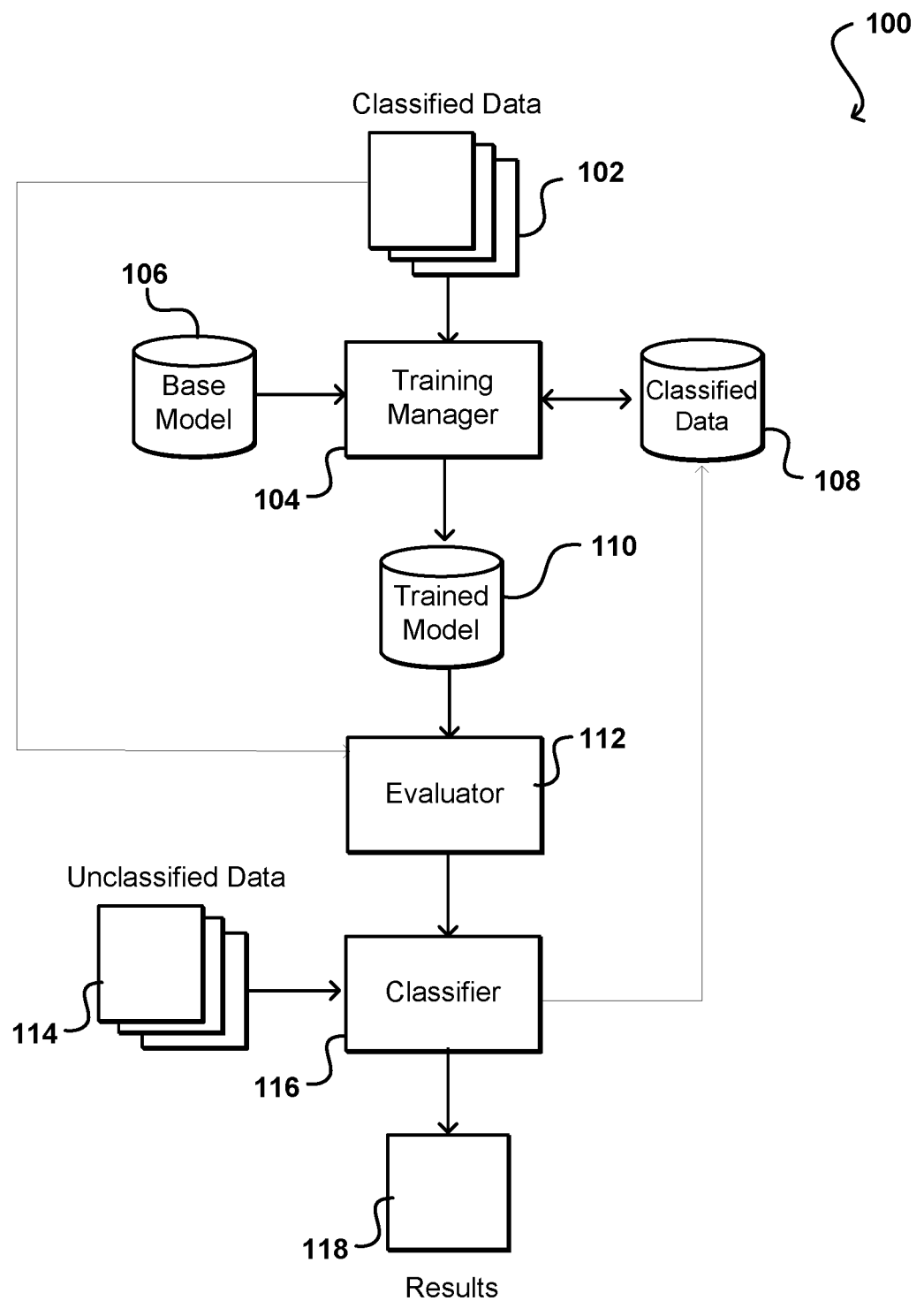
FIG. 1 illustrates an example system implementation that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for a selection of training data for use in training of a statistical model. In particular, various embodiments provide for selections of subsets of training data for specific passes or iterations of the model through the training process. The selection can attempt to reduce the amount of data to be processed by selecting the training data that will likely be of most training value for the pass, thus retaining accuracy while reducing the resources needed to perform a given iteration. In some embodiments a metric such as the loss or certainty is used to sample the data, such that easy-to-classify instances are used for training less frequently than harder-to-classify samples. In other embodiments a cutoff value or threshold can be used such that harder-to-classify samples are not selected for specific training iterations until later in the training process when the model may be more likely to benefit from training on those harder samples. Some embodiments can take advantage of both techniques, performing a sampling of the data and then applying a cutoff to the subset identified through the sampling, in order to reduce the number of easy instances and avoid processing harder instances that may not be beneficial to process for the current iteration. The sampling can vary between passes for variety and as the loss values change through training, and the cutoff value might also change in at least some embodiments such that all data points are eligible for training selection by at least the last iteration of the model through the training process.

Various other functions can be implemented within the various embodiments as well as discussed and suggested elsewhere herein.

As mentioned, the accuracy of statistical models can depend in part upon the amount of training data that is able to be utilized to train those models. A large data set can include many variations for a given classification, which can improve the ability of the statistical model to learn relationships for that classification versus other classifications, and to be able to sufficiently generalize that learning. A training process often involves multiple passes or iterations, where the training set is analyzed multiple times using the statistical model. The statistical model should improve in accuracy with each pass or iteration due to the additional "learning" obtained for that pass, which builds on the learning from earlier passes. Training on all the data in the large data set for each pass can require significant time, effort, resources, and cost. At least some of this data will be relatively easy to classify, such that the model will learn to accurately recognize those data instances in an early pass. Processing all those data instances again on subsequent passes will therefore not significantly improve the training of the model, but will require significant resources to be allocated. It may be more useful to train using the harder-to-classify data instances, which can become easier to classify as the model learns through the additional iterations. While it may be desirable to retain some of the easier instances or samples for each pass, in order to ensure the model remains trained for those types of instances, it may not be necessary to utilize all the easily classified instances for each pass or iteration.

Accordingly, approaches in accordance with various embodiments can utilize a sampling or sweeping approach to training data selection that can reduce the time and resources needed to train statistical models, such as machine learning algorithms or convolutional neural networks, among other such options. An acceleration of training can utilize training approaches, such as may relate to hard-case mining or self-paced curriculum learning, as well as a combination of those or other such approaches. Leveraging such learning techniques can yield an optimization procedure that is unbiased and that will converge more rapidly than conventional training approaches, due at least in part to factors such as automatic variance reduction. Training of machine learning, such as to train a deep learning algorithm using a large set of classified data, conventionally involves using all the training data for each pass or iteration of training. For large data sets, such as for a set with a million image files representing classified objects, this can take a significant amount of time and resources. These conventional methods treat samples that are relatively easy to classify, or that can be classified with high confidence, the same as samples that are relatively difficult to classify, or that cannot be classified with an acceptable or minimum threshold amount of confidence. Such equivalent treatment can result in a significant amount of work that does not significantly advance the training. An approach in accordance with one embodiment can select dynamically and intelligently select a subset of samples to use for training on each pass or iteration. This can include, for example, selecting fewer samples that are "easy" to classify while selecting a greater number of samples that are "difficult" or "hard" to classify. Such an approach reduces the number of times that a sample that is classified with high accuracy is used to train the model. In this way, a smaller amount of data can be utilized for training that also focuses effort on those samples that are more challenging to classify. At least some embodiments also select samples for a given training pass or iteration that are sufficiently easy to classify that they can be learned at the current training stage. Such an approach spends little time on samples or observations that have already been sufficiently learned, while primarily avoiding samples that are as of yet too difficult to classify. Such an approach therefore attempts to select an optimal subset of the data for training for any given pass, iteration, or stage. Such an approach can also utilize variance reduction due to sample reweighting and convex duality, such as for self-paced learning. Additional increases in training speed can be obtained for various types of data sets, including both text and image data, for example, but additional increases in speed may come with small losses in accuracy in at least some approaches, such that a tuning or balancing can be performed for optimal performance depending upon accuracy targets and other such factors. Given that some conventional training tasks may take several hours, or even days, to train on expensive GPU-inclusive machines, even a factor of two improvement in training speed can lead to substantial savings in computation time and reduction in resource capacity required. Such approaches can be used for statistical models and algorithms other than those related to machine learning, as would be apparent in light of the teaching and suggestions contained herein.

FIG. 1 illustrates an example system 100 that can be used to classify data in accordance with various embodiments. Various predictions, labels, or other outputs can be generated for input data as well, as should be apparent in light of the teachings and suggestions contained herein. In this example, a set of classified data 102 is provided as input to function as training data. The classified data can include instances of at least one type of object for which a statistical model is to be trained, as well as information that identifies that type of object. For example, the classified data might include a set of images that each includes a representation of a type of animal, where each image also includes, or is associated with, a label, metadata, classification, or other piece of information identifying the type of animal represented in the respective image. Various other types of data may be used as training data as well, as may include text data, audio data, video data, and the like. The classified data 102 in this example is provided as training input to a training manager 104. The training manager 104 can be a system or service that includes hardware and software, such as one or more computing devices executing a training application, for training the statistical model. In this example, the training manager 104 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 104 can select a base model, or other untrained model, from an appropriate repository 106 and utilize the classified data 102 to train the model, generating a trained model 110 that can be used to classify similar types of data.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified. For example, a machine learning model might be trained to predict whether an email message is spam or not spam. The training manager can be provided with training data that contains email messages for which the target is known, such as where each training message includes a label indicating whether a message is spam or not spam. A machine learning model can be trained using this data to generate a trained model that can attempt to predict whether new email will be spam or not spam.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. In some embodiments the training parameters can be set using a training console, API, or command line interface (CLI). If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

The predictive performance of complex machine learning models, such as those having many input attributes, can decrease if the data contains too many patterns. As the number of patterns increases, so does the likelihood that the model learns unintentional data artifacts rather than true data patterns. In such a case, the model does very well on the training data, but may be unable to properly generalize on new data. This phenomenon is known as overfitting the training data. Regularization helps prevent linear models from overfitting training data examples by penalizing extreme weight values. L1 and L2 regularization processes can be used in some embodiments. L1 regularization reduces the number of features used in the model by pushing the weight of features that would otherwise have very small weights to zero. L1 regularization produces sparse models and reduces the amount of noise in the model. L2 regularization results in smaller overall weight values, which stabilizes the weights when there is high correlation between the features. The amount of L1 or L2 regularization can be adjusted in at least some embodiments.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 110 can be provided for use by a classifier 116 in classifying unclassified data 114. In many embodiments, however, the trained model 110 will first be passed to an evaluator 112, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known, and use this assessment as a proxy for predictive accuracy on future data.

In some embodiments, a model is evaluated using a subset of the classified data 102 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 110 and the evaluator 112 can determine the accuracy of the model by comparing the ground truth data against the corresponding output (or predictions/observations) of the model. The evaluator 112 in some embodiments can provide a summary or performance metric indicating how well the predicted and true values match. If the trained model does not satisfy at least a minimum performance criterion, or other such accuracy threshold, then the training manager 104 can be instructed to perform further training, or in some instances try training a new or different model, among other such options. If the trained model 110 satisfies the relevant criteria, then the trained model can be provided for use by the classifier 116.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been overfit may perform well during evaluation, but may fail to make accurate predictions on new or otherwise unclassified data. To avoid selecting an overfitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 100 of FIG. 1, the trained model 110 after evaluation is provided, or made available, to a classifier 116 that is able to use the trained model to process unclassified data. This may include, for example, data received from users or third parties that are not classified, such as query images that are looking for information about what is represented in those images. The unclassified data can be processed by the classifier using the trained model, and the results 118 (i.e., the classifications or predictions) that are produced can be sent back to the respective sources or otherwise processed or stored. In some embodiments, and where such usage is permitted, the now classified data instances can be stored to the classified data repository 108, which can be used for further training of the trained model 110 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

In many data sets, however, there will be a fraction of the instances that will be relatively easy to classify. For example, consider the three instances 202, 204, 206 of training data illustrated in the set 200 of FIG. 2. Each of these instances can be labeled with the letter "A" where the machine learning model is being trained to recognize alphanumeric characters in image data. A first instance 202 includes a very clear and clean representation of the letter that should be easily classified. Once a machine learning model is trained to classify such an instance, which should happen on a very early pass, then the model will almost always properly classify or observe that instance on subsequent passes. A second instance 204 includes a slightly different version of the letter, which has a specific font and is italicized. This instance might be slightly harder for the machine learning to classify properly due to at least these differences, as illustrated with respect to the letter in the first instance 204. A third instance 206 may include a letter that has a very unique font which might be difficult for the algorithm to learn quickly and classify consistently. This particular instance has the further challenge of having other objects or design in the image, rather than just the letter against a plain or solid background. Accordingly, this instance might be considered to be difficult for the machine learning to learn to properly classify.

Approaches in accordance with various embodiments can reduce the amount of time, resources, and cost needed to train a machine learning model (or other statistical model) on such a data set by spending less time evaluating "easy" samples that will not significantly improve the accuracy or training when analyzed on subsequent passes. Such an approach can provide an optimization procedure that is unbiased and that will converge more rapidly due to, for example, automatic variance reduction. Such a process can involve a training manager, or other such system or service, selecting observations and labels that are determined to be challenging. In some processes the training manager can also select observations and labels that are sufficiently simple to classify that they can be learned at the current stage or pass, ignoring observations have already been learned and those that are determined to likely be too challenging for the current stage or pass.

The plots of FIGS. 3A-3C attempt to illustrate an example sampling process that can be used in accordance with various embodiments. For sake of simplicity of illustration and understanding the plot illustrates a binary decision where the machine learning classifies each instance or sample into one of two possible outcomes or observations, looking at two different parameters. It should be understood, however, that there may be many possible outcomes determined using many different parameters as discussed elsewhere herein. Thus, while the plot is two-dimensional it should be understood that in many situations the process would be associated with an n-dimensional evaluation space. In this example each instance classified with a first possible observation is represented by a "+" sign, with each instance classified with a second possible observation represented by a "−" sign. A boundary 302 is illustrated that separates the two classifications in the evaluation space. It should be understood that a linear boundary of a specific slope is an example and that the boundary can take many different forms in different examples or use cases.

As illustrated in the plot 300 of FIG. 3A, there are many samples that have been evaluated for both classifications. Some of these samples are illustrated to be closer to the boundary than others. The distance from the boundary 302 in this plot 300 is associated with the difficulty in classifying that sample. For example, a first sample 304 is illustrated far from the boundary. This is an indication that this sample is relatively easily classified, or can be classified with high confidence, etc. A second sample 306 is located much closer to the boundary, and in fact is almost at a position that would cause it to be classified as the other observation type. This is representative of this being a more challenging sample to classify. It should be noted that in this case some of the points near the boundary may have improperly been classified, and thus could be represented by the opposite symbol. In this particular illustration it should instead be understood that some of the classifications may have been incorrect. The symbols "+" and "−" indicate the proper classification. As illustrated, however, some of the data instances for a given pass have been misclassified, and thus appear on the wrong side of the boundary. As mentioned, the likelihood of a misclassification may be higher near the boundary.

In a conventional training approach, all these data samples would be used for training on each training pass for the selected model. As mentioned, however, the easily classified samples may provide for little additional learning on additional passes or training iterations. It can be desirable to select some of those samples for each pass, in order to ensure that the model is still able to accurately identify the easier samples, but improvements in learning for the model can benefit more from spending a higher percentage of the training effort on the more challenging samples. Using such a sampling approach has been proven to not significantly impact accuracy of the trained model, except in situations where the data selection may be too sparse. Such an approach can, however, significantly reduce the amount of processing time and effort needed for the training, such as by a factor of two or more in some instances.

FIGS. 3B and 3C illustrate plots 320, 340 of data instance sampling that can be used for subsequent training passes. As illustrated, the number of samples to process on each pass has been reduced significantly. Further, the proportion of samples to be processed near the boundary 302 is much greater than that of samples further from the boundary. Also as illustrated, the samples included in the selection for each pass are different, in order to allow for variety in sampling and training as discussed previously. The fraction or number of instances for a given pass, as well as the sampling function or approach, can vary between embodiments, as well as between passes in some instances.

In one embodiment, the selection of samples to use for a given pass is determined probabilistically, such as by using a determined probability density function, probabilistic sampling function, or other such approach. These can include, for example, stratified or systematic random sampling, cluster sampling, or multi-stage sampling, among other such options. Thus, the selection frequency of easier samples may be lower than that for harder samples by an amount that is correlated with the distance from the boundary, or the level or certainty for that sample. For example, if a value of 1.0 corresponds to the first categorization option and a value of 0.0 corresponds to the second categorization option, then a value of 0.49 or can represent a very challenging sample, as there is almost equal probability of the sample corresponding to either of the two classification types. Thus, the 0.49 sample might be selected for each pass, or almost each pass, while the 1.0 and 0.0 samples, which are easily and consistently classified, might be selected for only a small fraction of the training passes.

It should be noted, however, that in such an approach the weighting of the easier samples might be much higher than the weighting for the more challenging samples. While accurately classifiable samples need not be processed as much, they should still be weighted more heavily in at least some embodiments than difficult-to-classify samples which are more easily misclassified, where a higher weighting of relationships learned based on challenging samples might inadvertently decrease the overall accuracy of the model.

To illustrate an approach in accordance with one embodiment, a few definitions are presented. The example will continue with two-dimensional space in (x,y) coordinates in the space of covariates and labels, respectively. Samples ($x_i$, $y_i$)~p(x, y) are drawn from that space, according to the joint distribution over covariates and labels p. One goal is to minimize the (regularized) risk on the training set Z:={(x1, y1), . . . ($x_m$, $y_m$)}, i.e. to minimize:

$$R_{reg}[\theta] = \frac{1}{m}\sum_{i=1}^{m} l(x_i, y_i, \theta) + \lambda \Omega[\theta],$$

Here θ denotes the parameters of the model, e.g., the weights of a neural network, or the coefficients of a linear classifier in feature space (for kernel methods). Moreover, l(x, y, θ) is the loss, encoding the dependence between data, labels, and parameters, such as l(x, y, θ)=log(1+exp(−yf(x, θ))) for a binary classification and for some neural network f(x, θ), parametrized by θ. As discussed elsewhere herein, a loss function may be selected for backpropagation, for example, and the weights can be determined in some embodiments using the gradient of the relevant loss function. Also as mentioned, metrics such as confidence, certainty, or error may also be used as well in accordance with various embodiments.

To accelerate computation a training manager can attempt to estimate, for a given sample, whether the loss is large without actually computing the loss. First off, it should be noted that even if the weighting function is not perfect, an unbiased estimator can still be obtained in addition to one that is efficient. Further, a number of approximations can be made. One first heuristic relies on the fact that many losses are convex. Moreover, they vanish whenever the label is correct. By virtue of the chain rule, the magnitude of the loss is often a good indicator for the magnitude of the gradient. Hence, the loss (or alternatively the gradient of the last layer of the deep network) may be used as guidance for when to compute the gradient. One advantage of such a heuristic is that only gradients need to be computed for the terms where the loss is significant. Since that is the computationally most expensive part, effort required may be reduced. While iterating over the data the parameters change, and it is reasonable to assume that the loss (and the loss gradient) are Lipschitz continuous in the parameters.

Figure 4:
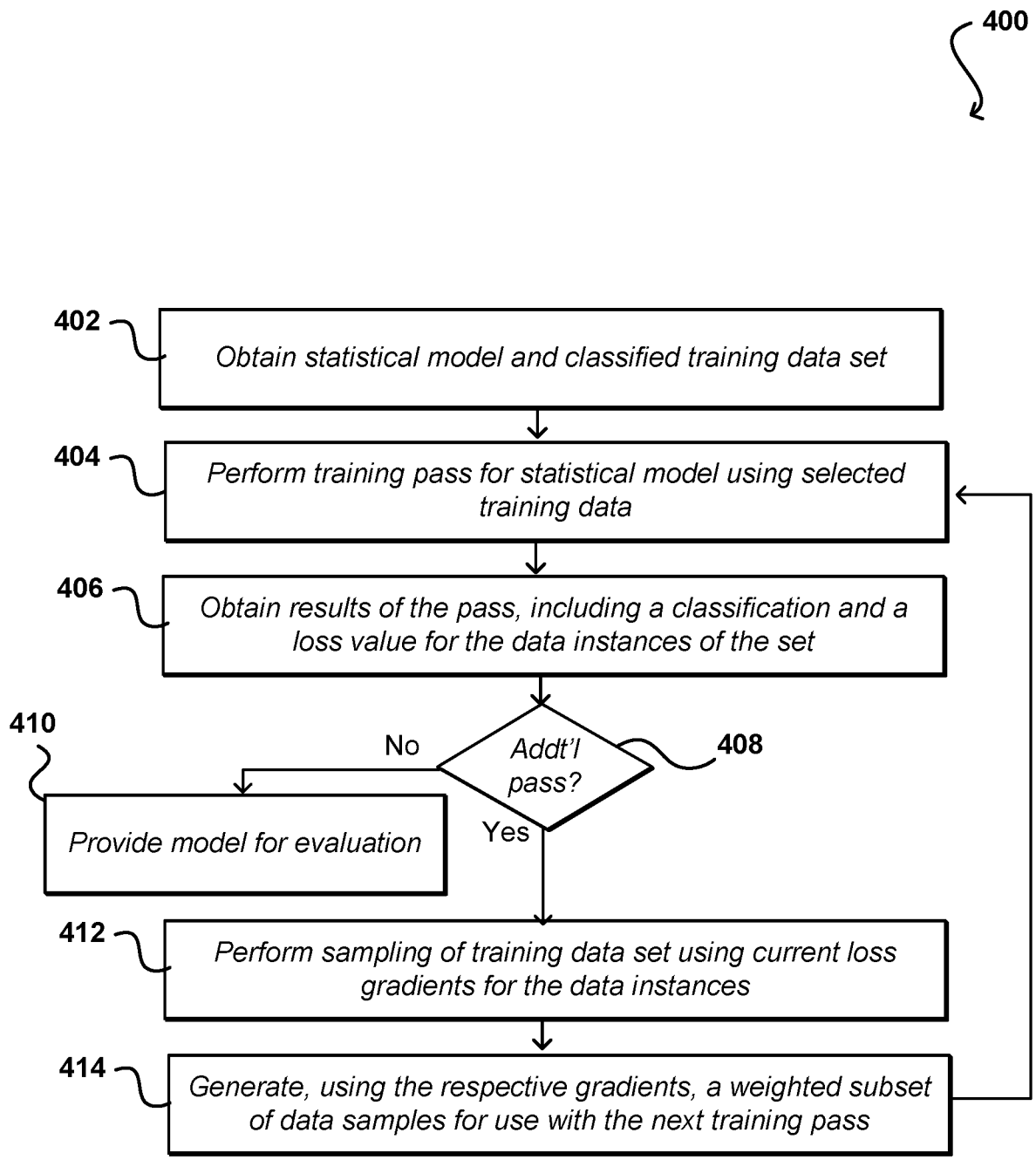
FIG. 4 illustrates an example process for training a statistical model that can be utilized in accordance with various embodiments.

FIG. 4 illustrates an example process 400 for training a model using a sampled training data set that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a statistical model (e.g., a machine learning model) is obtained 402 for training, as well as a classified training data set to be used. As mentioned, the data can include any appropriate type of data and the set can be of any appropriate size, as long as accurate labeling, classification, identification, or other information is provided for, or with, the individual data instances of the set for use in training the model. Using all, or a selected subset, of the training data, a first training pass can be performed 404 by providing the training data as input to the model for classification. The results of the training pass can be obtained 406, where each result can include a classification and loss value (or confidence value, accuracy metric, etc.,) for a respective data instance provided as input. Other values or results may be provided as well within the scope of the various embodiments. A determination can be made 408 as to whether at least one additional training pass is to be performed. As mentioned, there may be a fixed or maximum number of passes specified, and/or a convergence or termination criterion specified, within the scope of the various embodiments. If no more passes are to be performed for this particular training session, then the trained model can be provided 410 for evaluation, validation, and/or classification as discussed elsewhere herein.

If at least one additional pass is to be performed, a sampling of the full training data set can be performed 412 using the current loss gradients for the individual data instances. As mentioned, this "loss" gradient in at least some values is a function of, or derived from, the loss with respect to (at least some of) the parameters for the data instances, and the gradients can be used for both the sampling and the weighting as discussed herein. In some embodiments the gradients are functions of only the output as discussed herein. A normalized gradient, such as the inverse of the loss gradient, can also be used in some embodiments as discussed herein, particularly when determining the relative weightings. As mentioned, not every sample will be evaluated during each pass, so some of the loss values and/or gradients may be from earlier passes through the model. Each loss value, or corresponding confidence or certainty value, can be stored from the last pass for which that respective data instance was processed using the model. As mentioned, there may be a sampling, probability, or distribution function used, among other such options, to select a subset of the data instances based at least in part upon the respective loss values, where the probability of being selected is lower for samples with loss values indicating highly accurate or certain samples, which are referred to herein as "easy" samples. A subset of data samples to use for the next training pass is generated 414 from this sampling, where weighting values (as determined using the loss gradients) may be applied (in the subset or via the model) such that easier to classify samples have a higher weighting applied that more difficult to classify samples, as discussed herein. This data subset can then be used for a subsequent training pass. The process can continue until it is determined that no more passes are needed for this training session, whether due to a maximum number of passes being reached or a training termination criterion being satisfied, among other such options.

Other sampling approaches can be used as well within the scope of the various embodiments. As mentioned, it can be desirable to reduce the amount of data to be processed in any given pass, and it can be beneficial to spend a significant amount of training effort on more challenging data samples.

It may be the case, however, that little insight can be gained on a given pass from a sample that is very challenging to classify, and training on very difficult samples before the model has sufficiently been trained can lead to problems with convergence. Improved training may be obtained by starting with a subset of data that is easier to classify, in order to begin to train the model. As the model is trained, more challenging samples can be processed that might now be easier for the model to classify based on its current state of learning.

Figure 5A:
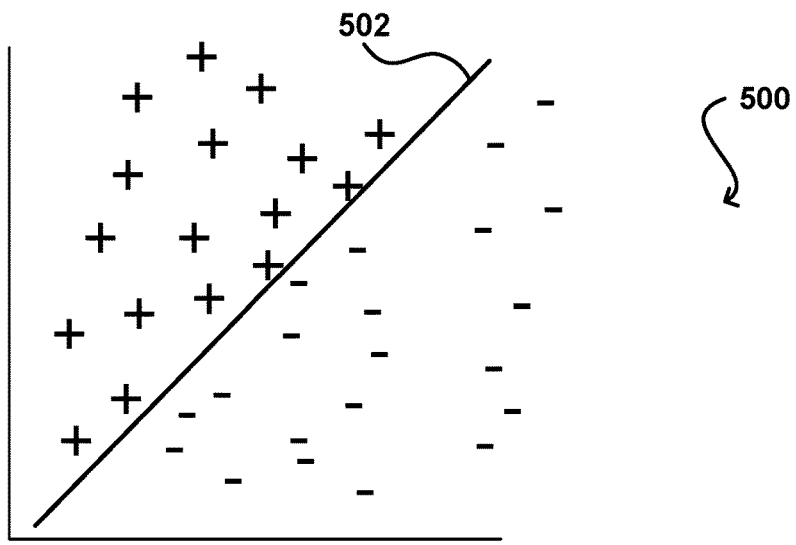
FIGS. 5A, 5B, and 5C illustrate plots of data classifications that can be generated in accordance with various embodiments.

For example, consider the plot 500 of FIG. 5A. The basic setup and parameters for this plot are similar to those presented in FIG. 4. There are many samples illustrated that have been classified, with some being represented closer to the boundary 502 that others based on a metric such as the loss value. As discussed elsewhere herein, a representation of the loss or confidence can be a vector or gradient in sample space. As mentioned, using all these data samples in a given pass can require significant time and resources. Further as mentioned, using the difficult samples for training for early passes can lead to problems with convergence of the model.

Figure 5B:
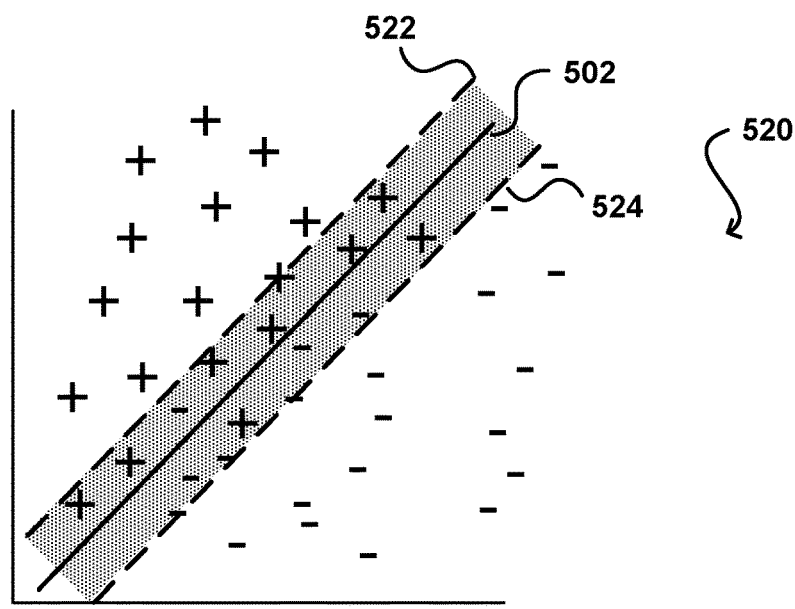

Accordingly, approaches in accordance with various embodiments can use one or more cutoff thresholds to determine which subset of data points are to be used for a given training pass. One such cutoff threshold is illustrated in the example plot 520 of FIG. 5B. In this example, the boundary might represent values of 0.5 in sample space. An initial cutoff value might then be set at +/−0.1, resulting in two thresholds 522, 524 at 0.4 and 0.6, respectively. Thus, for the next pass only data instances with observations greater than 0.6, or less than 0.4, would be selected for training. Data instances with observations between 0.4 and 0.6, represented by the shaded region of the plot, would not be selected for training on the next or current pass. Such an approach helps to ensure that early training of the model is on easier to classify samples. As mentioned, there can be some estimate of loss for the samples performed before training, or an initial training pass (or set of initial passes) can be used to generate approximate loss values, which can then be used to determine which samples fall inside, or outside, the cutoff. In some embodiments, the initial results might be used to determine the cutoff values as well, such as may be based on a number or fraction of samples to be included for a given training pass.

Figure 5C:
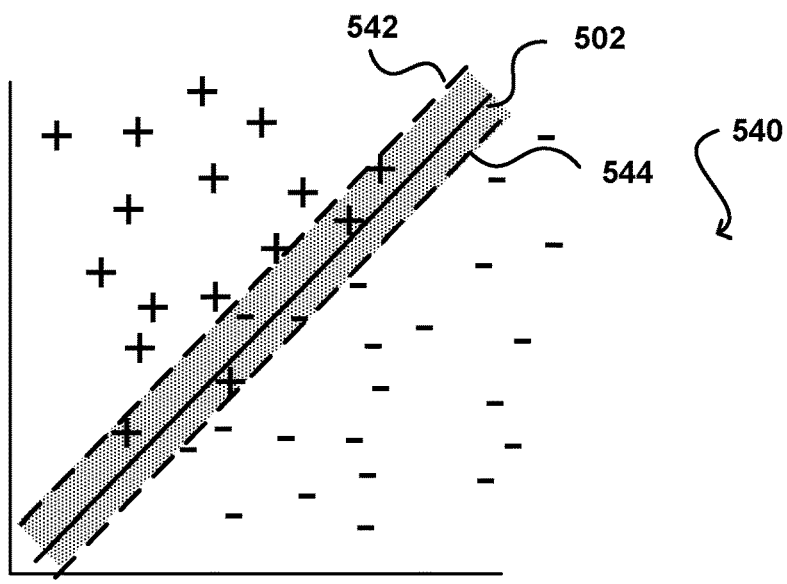

As the training progresses, the location of various data instances on the plot will change. This results from the model learning, and some of the data instances becoming easier to classify (and thus moving further away from the cutoff value). Thus, in some embodiments the cutoff value may stay the same between passes, but additional data can be used for training as the model becomes more accurate and additional data samples will move past the cutoff threshold. In some embodiments the cutoff values may change over time in order to include harder samples in the training process. For example, if there are to be 100 passes then a cutoff might start at +/−0.1 on an early pass, but go to +/−0 for the $100^{th}$ pass. By the last pass, all samples will have been used for training at least once, no matter the difficultly in classifying that data sample. The change in cutoff value can use any appropriate altering function, such as a linear or exponential function, among other such options. As illustrated in the plot 540 of FIG. 5C, the cutoff thresholds 542, 544 have changed relative to those of FIG. 5B, and some of the data instance locations have changed due to the improved accuracy of the model, such that a different subset of training data would be used for this particular pass relative to the pass corresponding to FIG.

Figure 6:
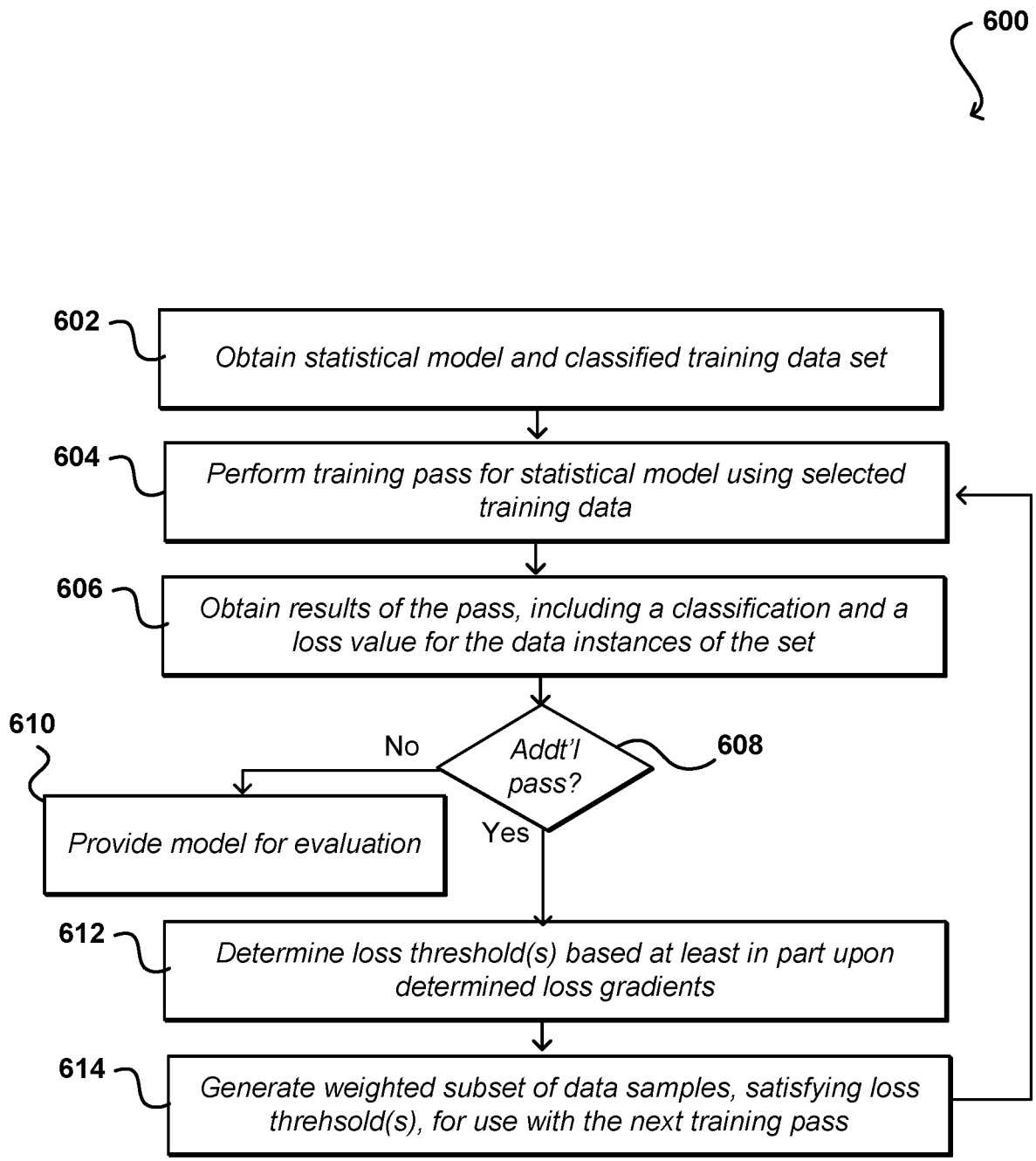
FIG. 6 illustrates an example process for training a statistical model that can be utilized in accordance with various embodiments.

FIG. 6 illustrates an example process 600 for training a model using a sampled training data set that can be utilized in accordance with various embodiments. In this example, a statistical model (e.g., a machine learning model) is obtained 602 for training, as well as a classified training data set to be used. Using all, or a selected subset, of the training data, a first training pass can be performed 604 by providing the training data as input to the model for classification. The results of the training pass can be obtained 606, where each result can include a classification and loss value (or confidence value, accuracy metric, etc,) for a respective data instance provided as input. Other values or results may be provided as well within the scope of the various embodiments. A determination can be made 608 as to whether at least one additional training pass is to be performed. As mentioned, there may be a fixed or maximum number of passes specified, and/or a convergence or termination criterion specified, within the scope of the various embodiments. If no more passes are to be performed for this particular training session, then the trained model can be provided 610 for evaluation, validation, and/or classification as discussed elsewhere herein.

If at least one additional pass is to be performed, a cutoff value or loss threshold can be determined 612. This can be a single threshold or set of thresholds, such as the boundary plus or minus a specific amount. The cutoff value might also be a single value or range of values, among other options discussed and suggested herein. In at least some embodiments the cutoff values or threshold(s) can be determined based in part upon the determined loss values, or loss gradients, for the data set. For example, a given pass might include at most a maximum number of data points, so the threshold or cutoff might be set at a value that will result in that number of data points being processed in a next pass. Other functions of the loss values can be utilized as well, and the value might change over the training process, as the instances should get easier to classify so fewer points would be prevented from being processed on a given pass for a single cutoff value. In this example a weighted subset of data samples can be generated 614 from the full training data set using the current loss values for the individual data instances with respect to the determined cutoff or threshold for the next pass. As mentioned, not every sample will be evaluated during each pass, so some of the loss values may be from earlier passes through the model. Each loss value, or corresponding confidence or certainty value, can be stored from the last pass for which that respective data instance was processed using the model. As mentioned, the weighting values may be applied (in the subset or via the model) such that easier to classify samples have a higher weighting applied that more difficult to classify samples, as discussed herein. This data subset can then be used for a subsequent training pass. The process can continue until it is determined that no more passes are needed for this training session, whether due to a maximum number of passes being reached or a training termination criterion being satisfied, among other such options.

In the example process of FIG. 6, however, the easy-to-classify samples may still be used for each given training pass. While such a process avoids unnecessarily training on difficult samples before the model is sufficiently trained, it may still train more than is necessary on some of the easier samples, at least for some data sets. Approaches in accordance with various embodiments can attempt to obtain advantages of processes such as those described with respect to FIGS. 4 and 6 to avoid processing of easy and hard samples where such avoidance does not negatively impact the accuracy of the trained model, at least not more than a specified accuracy threshold or criteria, etc. Further, in at least some embodiments the thresholds may be treated as "soft" thresholds instead of "hard" thresholds. In such instances, at least some of the data instances that do not satisfy the cutoff thresholds may still be selected, but will be treated differently than those that satisfy the threshold. For example, a sampling function might be used to select a subset of the data instances that do not satisfy the threshold in order to still allow for some training or consideration of difficult data for a given pass, without spending an unnecessary amount of resources training on the difficult data that may not improve the training of the model for a given pass. Various sampling criteria or functions can be used with soft thresholds in accordance with various embodiments.

Figure 7A:
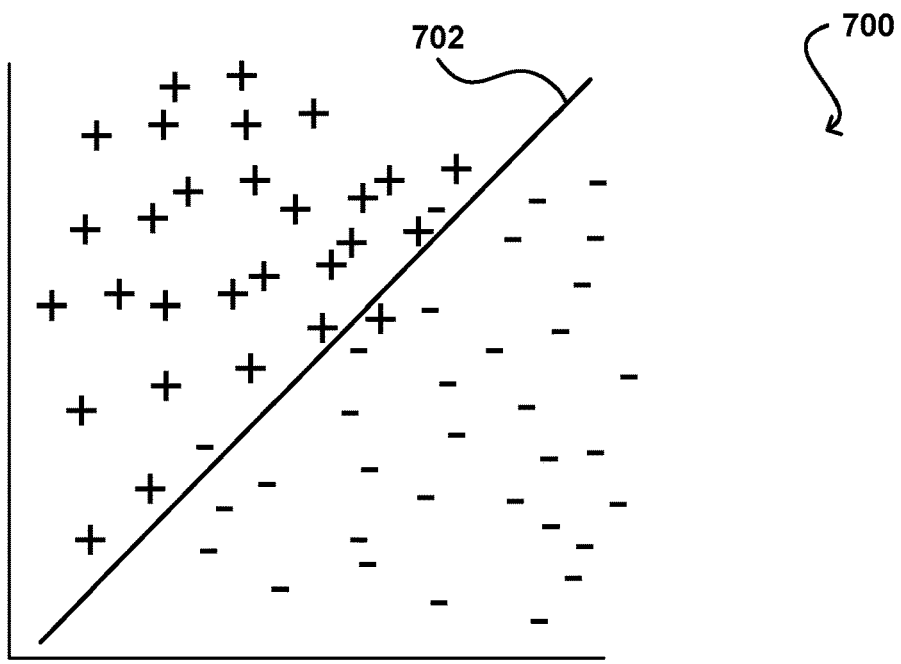
FIGS. 7A and 7B illustrate plots of data classifications that can be generated in accordance with various embodiments.
Figure 7B:
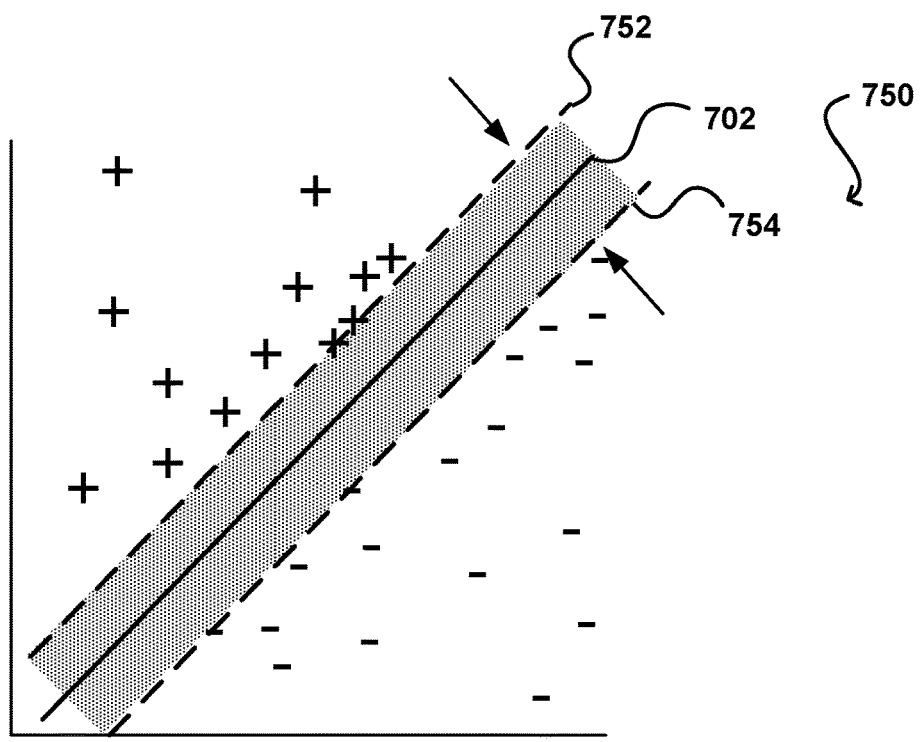

For example, consider the plot 700 of FIG. 7A, which is similar to some of the plots presented previously where classified data points are plotted in sample space. The axes again can correspond to parameters that are analyzed for the classification in two dimensions, although other approaches are possible as well as discussed and suggested herein. A sampling approach can be applied to the data, as discussed with respect to the example process of FIG. 4. As illustrated in the example plot 750 of FIG. 7B, this can result in a sampling of the training data set that includes fewer easy samples, at a distance from the boundary, than difficult to classify samples, which are located closer to the boundary 702. As discussed, this has the advantage of requiring fewer easily classifiable samples to be processed on a given pass, which reduces cost and resource requirements while maintaining classification accuracy. In order to further reduce the costs associated with training, one or more cutoff values or thresholds 752, 754 can be applied as well as illustrated in FIG. 7B. Using such an approach, at least some of the more difficult to classify samples will be excluded from processing for a given training pass. This enable the sampling for a given pass to include the most useful data for a given pass, excluding from consideration many easy points that will no longer significantly contribute to the training, while also excluding from consideration many of the hardest to classify samples that would not yet be classifiable by the model. As mentioned, the sampling or selection of easy instances can vary between passes for variance, and can change as the samples become easier to classify on subsequent passes. In many instances, the number of data points to be processed will decrease on each subsequent pass or iteration, as at least some of the instances will become easier for the model to classify based upon the additional training pass. Further, the thresholds can vary over time as discussed, as may also be based in part upon the loss values as the samples become easier to classify. In some embodiments the thresholds will vary based on the iterations themselves, not the loss values, and may change from an initial value on a first pass to a zero or other value for the final pass, such that all data points in the set are available for selection for at least the final pass. As mentioned, the function for threshold adjustment can be linear or non-linear over the number of passes in some embodiments. In some embodiments there may also be a minimum number of data points for a given pass, such that the cutoff values or thresholds may be removed if the number of points that would be selected from the sweeping or sampling approach would fall below the minimum number, such as where the model becomes highly accurate and the majority of the training data can be classified with high confidence or low loss, etc.

Figure 8:
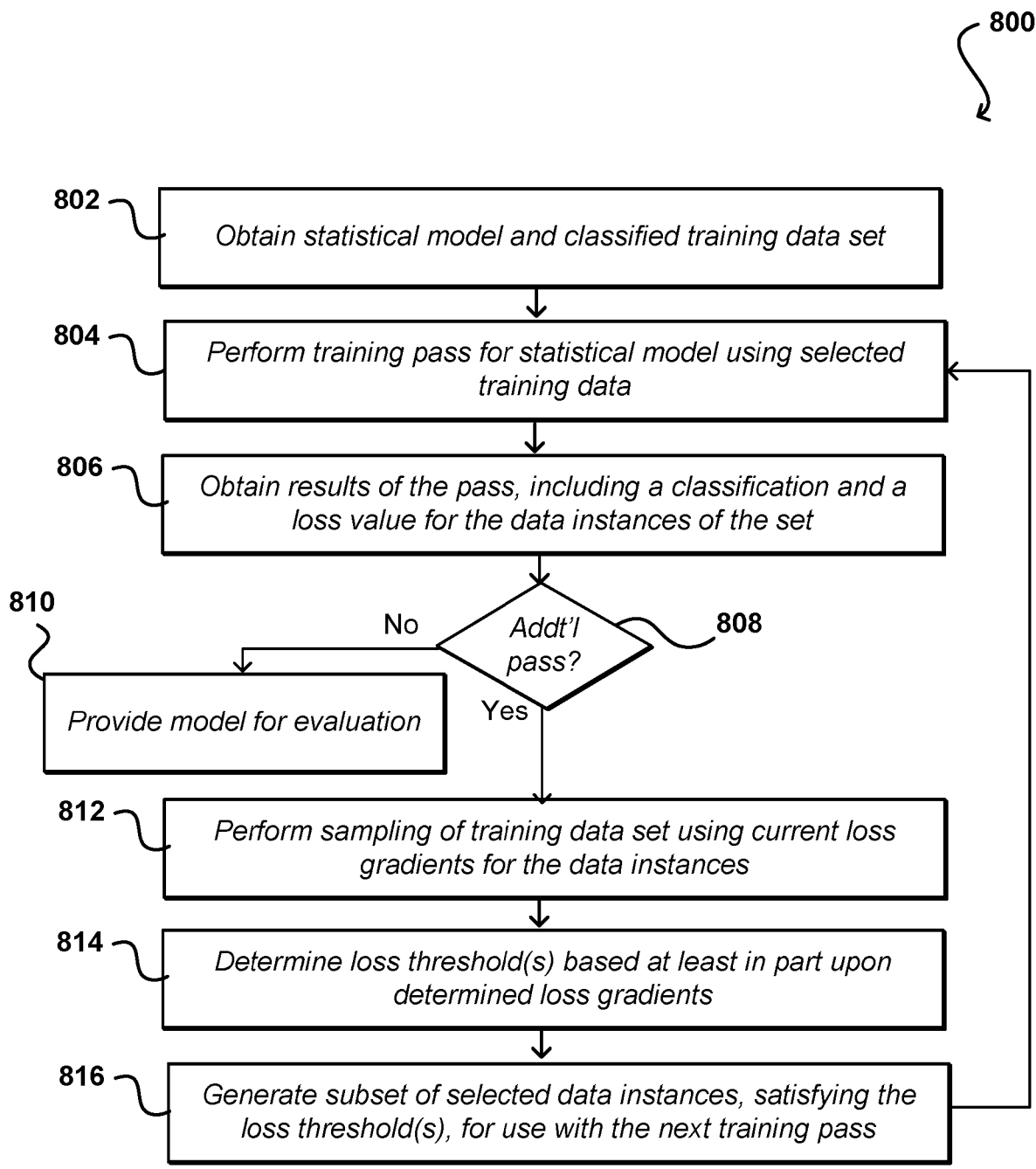
FIG. 8 illustrates an example process for training a statistical model that can be utilized in accordance with various embodiments.

FIG. 8 illustrates an example process 800 for training a model using a sampled training data set that can be utilized in accordance with various embodiments. In this example, a statistical model (e.g., a machine learning model) is obtained 802 for training, as well as a classified training data set to be used. Using all, or a selected subset, of the training data, a first training pass can be performed 804 by providing the training data as input to the model for classification. The results of the training pass can be obtained 806, where each result can include a classification and loss value (or confidence value, accuracy metric, etc.) for a respective data instance provided as input. Other values or results may be provided as well within the scope of the various embodiments. A determination can be made 808 as to whether at least one additional training pass is to be performed. As mentioned, there may be a fixed or maximum number of passes specified, and/or a convergence or termination criterion specified, within the scope of the various embodiments. If no more passes are to be performed for this particular training session, then the trained model can be provided 810 for evaluation, validation, and/or classification as discussed elsewhere herein.

If at least one additional pass is to be performed, a sampling of the full training data set can be performed 812 using the current loss values for the individual data instances. As mentioned, not every sample will be evaluated during each pass, so some of the loss values may be from earlier passes through the model. As mentioned, there may be a sampling, probability, or distribution function used, among other such options, to select a subset of the data instances based at least in part upon the respective loss values, where the probability of being selected is lower for samples with loss values indicating highly accurate or certain samples, which are referred to herein as "easy" samples. Further, a cutoff value or loss threshold can be determined 814. This can be a single threshold or set of thresholds, such as the boundary plus or minus a specific amount. The cutoff value might also be a single value or range of values, among other options discussed and suggested herein. In at least some embodiments the cutoff values or threshold(s) can be determined based in part upon the determined loss values for the data set. For example, a given pass might include at most a maximum number of data points, so the threshold or cutoff might be set at a value that will result in that number of data points being processed in a next pass. Other functions of the loss values can be utilized as well, and the value might change over the training process, as the instances should get easier to classify so fewer points would be prevented from being processed on a given pass for a single cutoff value. In this example a weighted subset of data samples can be generated 816 using the sampling, then applying the determined cutoff or threshold for the next pass to further reduce the subset to exclude at least some of the harder-to-classify samples for some iterations. As mentioned, weighting values may be applied (in the subset or via the model) such that easier to classify samples have a higher weighting applied that more difficult to classify samples, as discussed herein. This data subset can then be used for a subsequent training pass. The process can continue until it is determined that no more passes are needed for this training session, whether due to a maximum number of passes being reached or a training termination criterion being satisfied, among other such options.

As mentioned, in some embodiments the sampling is performed probabilistically. In some embodiments, the loss can be used for the sampling as discussed. This can include, for example, calculating a value for a parameter referred to herein as alpha. Alpha can be proportional to the gradient for a given sample, which is also associated with the loss for that sample. A sample that is properly and strongly classified would have a small loss, while a sample that is misclassified might have a greater loss value. A sample that is perfectly classified, or always properly classified, would ideally have a loss value of 0. If the loss or gradient is high, then there was likely a mistake made and the sample is likely harder to classify. Thus, samples with higher loss values should be selected more frequently in various embodiments. Samples with lower loss values, that are easily classifiable, can be selected less frequently. A cutoff value might then be with respect to the loss value, as a loss value from 0.0-0.5, for example, might have a cutoff value of 0.45, where only samples with loss values of 0.45 or less can be selected for a given training pass or iteration. In some embodiments samples are then selected proportional to the loss or gradient, which is a reflection of how easy or difficult that sample is to classify. And the samples could then be weighted by their respective alpha values in some embodiments, where well-classified samples are weighted higher than poorly-classified samples, etc.

When training, the correct classification or value of the sample is known. If the sample is routinely classified correctly, the point would be determined to be an easy sample. If a sample is classified correctly it can be given a value of 0.9 on a scale from 0.0 to 1.0. If classified incorrectly the sample can be given a value of 0. Thus, easy samples that are often classified correctly might have a value of 0.9, and a hard sample might have a classification of 0.1 (or 0.51 if between two classifications, etc.). These values can then be provided as a value of how well classified the sample is. A value such as alpha can also be stored for each, which represents the gradient and can be used for weighting. As mentioned, for each training pass of the network the gradients should change. If one result is (1,0) for the classification, and the other is (0,1), then the hard sample might be (0.5, 0.5). If the correct classification is (1,0) and the result of the processing is (0.9, 0.1), then the loss in one embodiment is given by $L=(1-0.9)^2+(0-0.1)^2$, although other functions can be used as well as discussed elsewhere herein. To get the gradient, the loss is differentiated with respect to the parameters. The weights can be estimated backpropagation, and once the weights are adjusted a forward propagation can occur where the predictions are performed based on those weights. The weights in many embodiments are calculated automatically by the model during training.

When processing data with a process such as deep learning, the models can be very large and complex, which can require a significant amount of processing power. The amount of processing power often correlates with how many floating point operations are to be performed within a given amount of time to obtain predictions ore results within a maximum amount of time, or with no more than a maximum amount of latency. As mentioned, GPUs are well suited for such processing, although other processing systems or components can be used as well within the scope of the various embodiments. Other ASICs or components can be used as well in various embodiments, as may include tensor processing units (TPUs) an the like. While at least some processing may be performed offline, in at least some situations the data received with requests will be "live" or "active" data that is only available with the request for which results are to be provided, or otherwise at runtime, and thus must be performed in near real time in at least some embodiments. Examples of live data include time of day of a given request or an address to which the results are to be provided, etc. Running these large, complex models on the GPU can be significantly more efficient than running them on the CPUs. In some instances there is not even enough processing power to process these models on a CPU. Approaches presented herein can help to ensure that maximum performance, or at least improved performance, is received from the GPUs for this near-real time analysis.

There may also be multiple GPU implementations in some embodiments. The data can be split across multiple GPUs, broken down by row, column, or another such metric. The results of the processing can then be merged back together to the CPU. The operations of the model and the data can thus be sharded across multiple GPUs to improve capacity without increasing latency.

In some embodiments, various accelerators can be utilized in a multi-stream, multi-GPU implementation of the kernel. In such an approach, multiple copies of the same collection can be maintained in GPU memory and multiple batch queues can be operated. This can result in an n-fold increase in throughput. Experimenting with high-speed direct data transfers between GPUs can lead to highly performant multi-GPU algorithms. In one experiment, trading off precision for performance by using half-precision on tensor cores yielded a 4× performance improvement. On the service side, a module to control timeouts in a dynamic fashion can be implemented. Timeouts can be adjusted lower when the TPS is low for quick responses and higher for high TPS to improve GPU utilization by decreasing kernel invocations on partially filled batches. For extremely high values of k the response sizes will be larger and may bottleneck on certain load balancing services. In this case, using a Network Load Balancer (NLB) may yield better performance as NLB can operate at a lower layer in the network stack. Finally, the learnings and results shown in this paper can translate to various GPU-based algorithms and therefore can be used to enable scalable cost-effective real-time inference for large and complex deep learned models.

Figure 9:
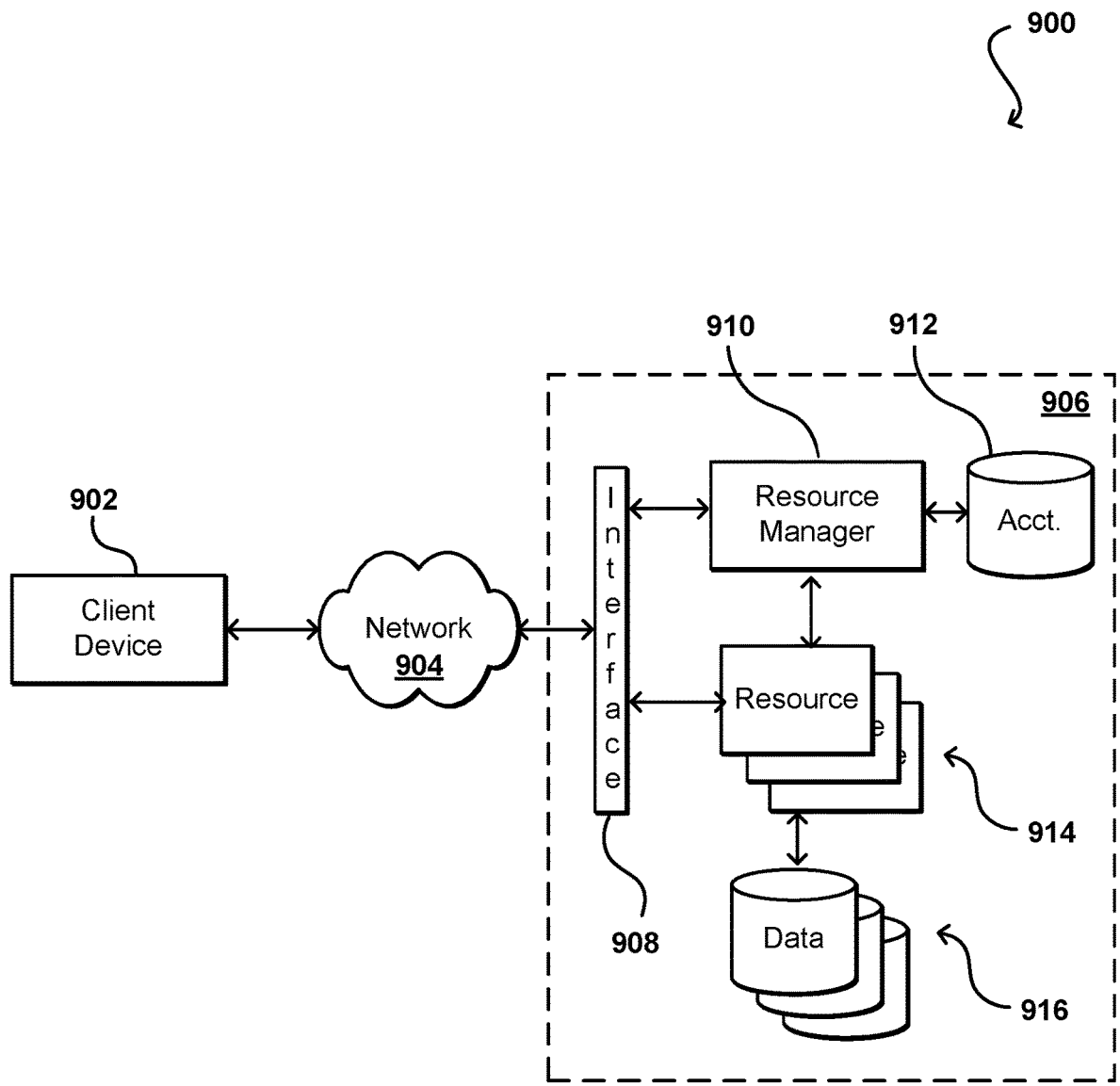
FIG. 9 illustrates an example environment in which various embodiments can be implemented.

FIG. 9 illustrates an example environment 900 in which aspects of the various embodiments can be implemented. Such an environment is sometimes referred to as a "cloud" environment, where resources are able to be allocated on an as-needed basis to perform certain tasks, such as to analyze input data using a trained statistical model as discussed herein. In this example a user is able to utilize a client device 902 to submit requests across at least one network 904 to a multi-tenant resource provider environment 906. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 904 can include any appropriate network, including an intranet, the Internet, a cellular network, a local area network (LAN), or any other such network or combination, and communication over the network can be enabled via wired and/or wireless connections. The resource provider environment 906 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 914 of one or more types. These types can include, for example, application servers operable to process instructions provided by a user or database servers operable to process data stored in one or more data stores 916 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 914 can submit a request that is received to an interface layer 908 of the provider environment 906. The interface layer can include application programming interfaces (APIs) or other exposed interfaces enabling a user to submit requests to the provider environment. The interface layer 908 in this example can also include other components as well, such as at least one Web server, routing components, load balancers, and the like. When a request to provision a resource is received to the interface layer 908, information for the request can be directed to a resource manager 910 or other such system, service, or component configured to manage user accounts and information, resource provisioning and usage, and other such aspects. A resource manager 910 receiving the request can perform tasks such as to authenticate an identity of the user submitting the request, as well as to determine whether that user has an existing account with the resource provider, where the account data may be stored in at least one data store 912 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 902 to communicate with an allocated resource without having to communicate with the resource manager 910, at least until such time as a relevant aspect of the user account changes, the user is no longer granted access to the resource, or another such aspect changes.

The resource manager 910 (or another such system or service) in this example can also function as a virtual layer of hardware and software components that handles control functions in addition to management actions, as may include provisioning, scaling, replication, etc. The resource manager can utilize dedicated APIs in the interface layer 908, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 908 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

Figure 10:
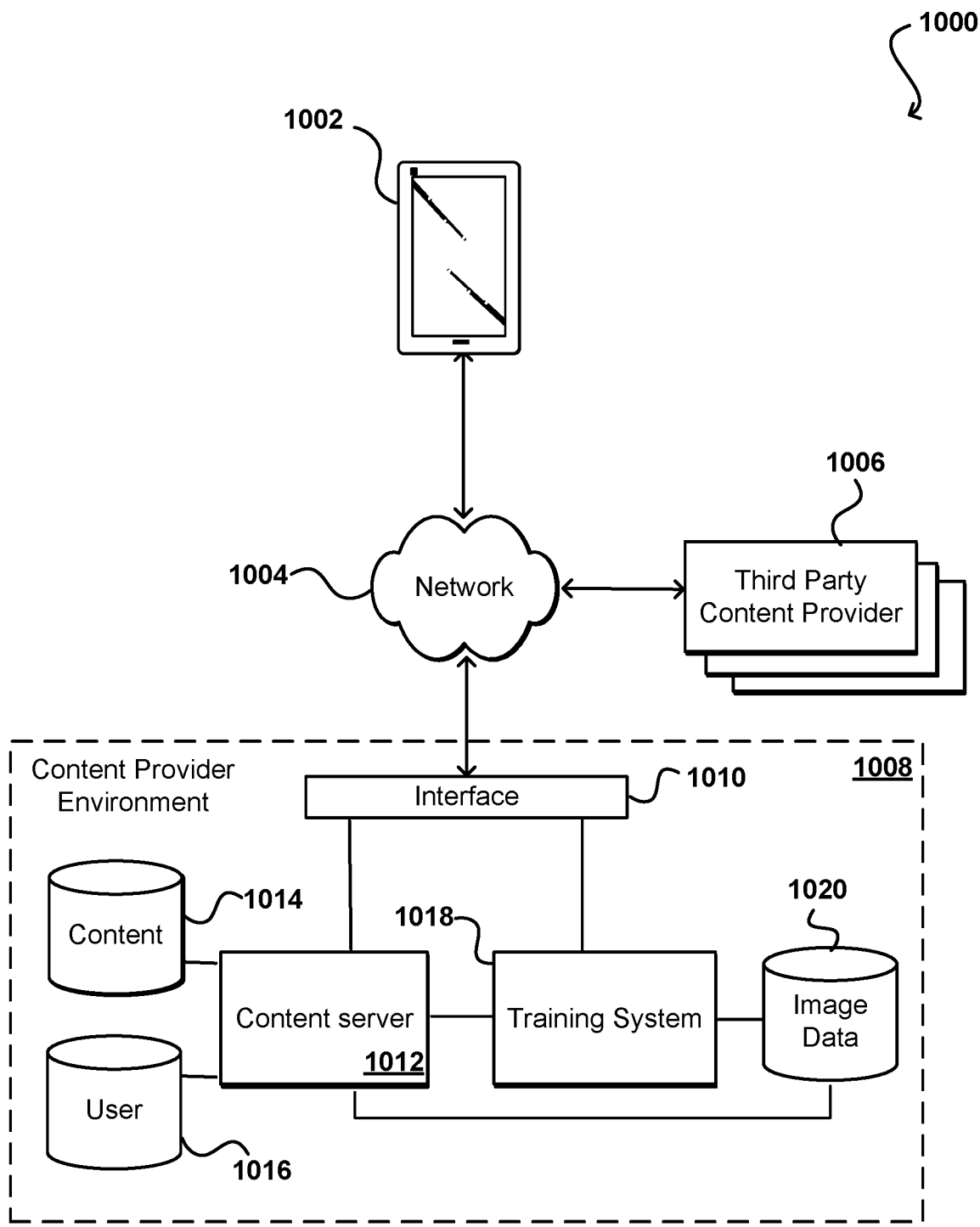
FIG. 10 illustrates and example system for determining content using a trained statistical model that can be utilized in accordance with various embodiments.

FIG. 10 illustrates an example environment 1000 that can be used to implement aspects in accordance with various embodiments. As mentioned elsewhere herein, various network training and data manipulation tasks can be performed on a client device or by a network service, among other such options. This example will utilize image analysis merely as an example. In FIG. 10, a client computing device 1002 can submit a request for content across at least one network 1004 to be received by a content provider environment 1008. As mentioned, in at least some embodiments the request can include an input image, or query image, for which a user of the client computing device 1002 wants to obtain classification or identification information, for example. Upon identifying an object represented in the image, it might also be desirable for the content provider environment to provide content relating to the identified object. The network(s) can include any appropriate network, such as the Internet, a local area network (LAN), a cellular network, an Ethernet, or other such wired and/or wireless network. The content provider environment 1008 can include any appropriate resources for providing content from a resource provider, as may include various servers, data stores, and other such components known or used for providing content from across a network (or from the "cloud").

In this example, a call received to the content provider environment 1008 can be received by an interface layer 1010 of the environment. As known for network environments, the interface layer can include components such as interfaces (e.g., APIs), load balancers, request and/or data routers, and the like. If the request is a request for content, such as for content related to a query image, information for the request can be directed to one or more content servers 1012, which can obtain the relevant content from a content data store 1014 or other such repository to be sent back across the network(s) to the computing device. In some embodiments, information for the request might be compared against user data in a user data store 1016 or other such location to determine, for example, whether the user has access rights to that content. In some cases, a call or request received to the content provider environment 1008 might be from another entity, such as a third party content provider 1006. As discussed previously, such providers may provide images and information to be displayed to users along with the served content. This content may relate to a specific item, product, or other such object associated with a product. At least some of these images can be used to train neural networks as discussed herein. In some embodiments the content provider network will call into such a third party system for the content.

The interface layer can determine the type of call or request and cause information to be forwarded to the appropriate component or sub-system. For example, training images can be stored to a data store 1020 for use in training a neural network by a training system or service 1018, with the resulting training sets being stored to the same or a different data store 1020, or the content repository 1014. When a request for content is received, the query image can be processed using a trained neural network in order to identify the object represented in the query image. In other embodiments, images having already been classified by the neural network might be stored to the image data repository 1020 and then compared against the query image using a feature match process, among other such options. Once the identification is made, the identification information can be forwarded to the content server 1012 which can pull the corresponding content from an appropriate data store 1014 or 1020 and returned to the client computing device 1002. A similar approach can be used for sound or video, for example, where data from a trained neural network can be provided in response to receiving a classification in order to provide audio and/or video data.

Figure 11:
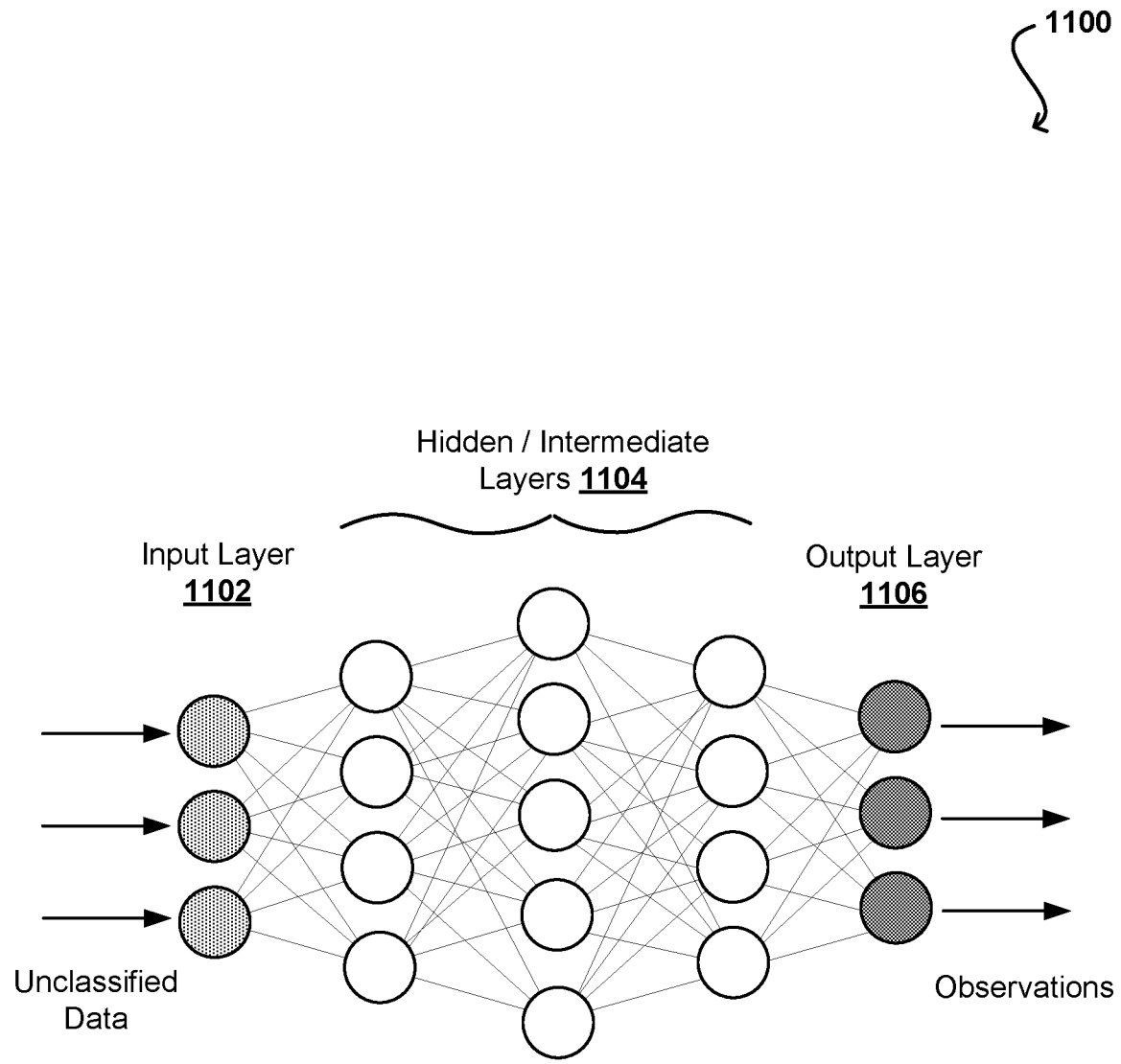
FIG. 11 illustrates layers of an example statistical model that can be utilized in accordance with various embodiments.

FIG. 11 illustrates an example statistical model 1100 that can be utilized in accordance with various embodiments. In this example the statistical model is an artificial neural network (ANN) that includes a multiple layers of nodes, including an input layer 1102, an output layer 1106, and multiple layers 1104 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of a instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 12:
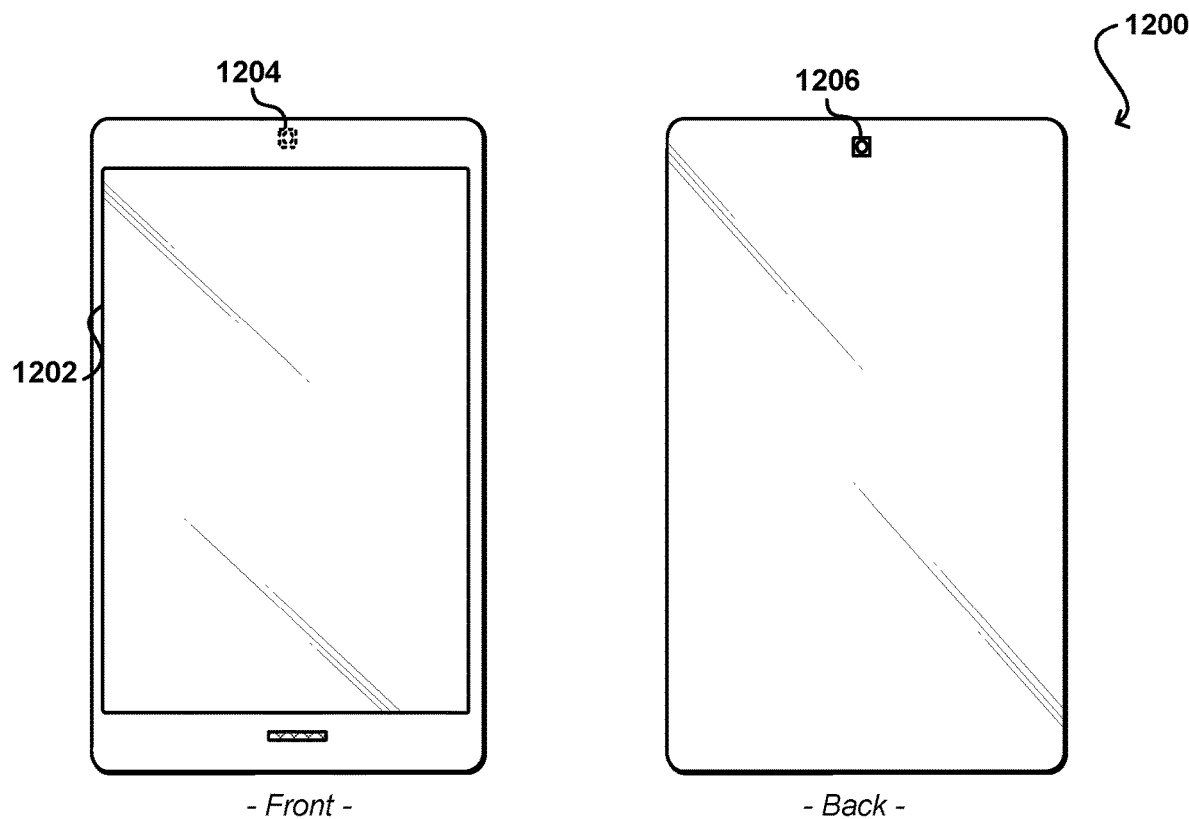
FIG. 12 illustrates front and back views of a client computing device that can be used to provide unclassified data in accordance with various embodiments.

FIG. 12 illustrates an example of a computing device 1200 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others. Such a device may be used to, for example, capture or generate unclassified data, and submit that data for classification.

In this example, the computing device 1200 has a display screen 1202, which under normal operation will display information to a user facing the display screen (e.g., on the same side of the computing device as the display screen). The computing device in this example can include one or more image capture elements, in this example including one image capture element 1204 on the back side of the device, although it should be understood that image capture elements could also, or alternatively, be placed on the sides or corners of the device, and that there can be any appropriate number of capture elements of similar or different types. Each image capture element 1204 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 13:
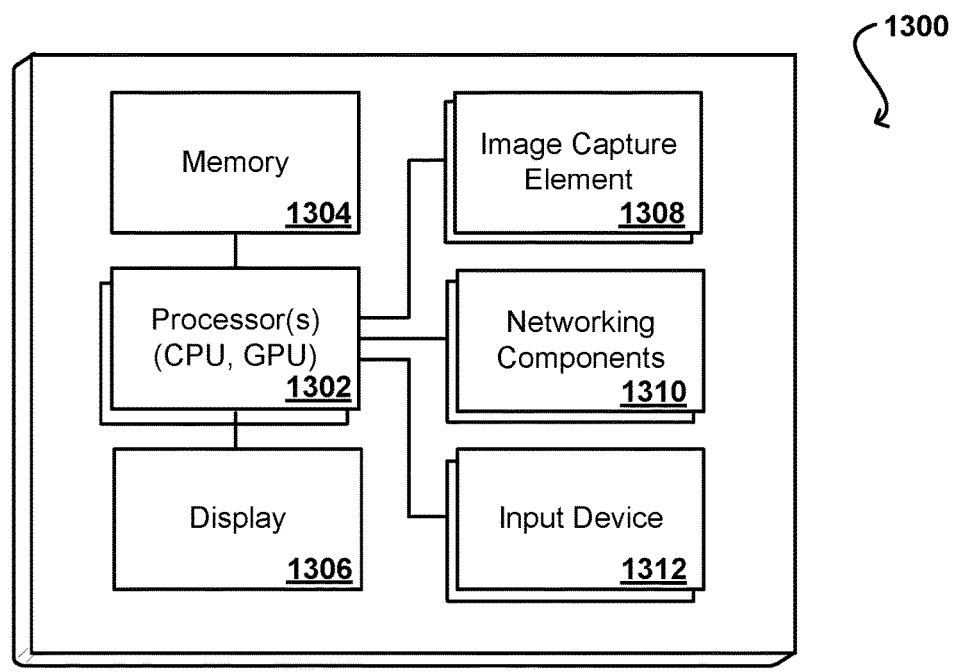
FIG. 13 illustrates example components of a computing device that can be used to implement aspects of the various embodiments.

FIG. 13 illustrates a set of basic components of a computing device 1300 such as the device 1200 described with respect to FIG. 12. In this example, the device includes at least one processor 1302 for executing instructions that can be stored in a memory device or element 1304. As would be apparent to one of ordinary skill in the art, the device can include many types of memory, data storage or computer-readable media, such as a first data storage for program instructions for execution by the processor 1302, the same or separate storage can be used for images or data, a removable memory can be available for sharing information with other devices, and any number of communication approaches can be available for sharing with other devices. The device typically will include some type of display element 1306, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1308, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1310 enabling the device to communicate with remote systems or services such as content providers and rights determining systems. These components can include, for example, wired or wireless communication components operable to communicate over a network such as a cellular network, local area network, or the Internet. The device can also include at least one additional input device 1312 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining a set of training data for training a model, the training including multiple iterations, the set of training data including data instances each having a specified classification;
   selecting, for a respective iteration of the training, a subset of the training data to use for the training, selection probabilities for instances of the set of training data being higher for instances having lower accuracies of classification as determined using a set of loss gradients for the instances of the set of training data, the subset of the training data selected using a probabilistic sampling algorithm accepting the loss gradients for the data instances of the set, the loss gradients derived from loss values representing a measure of inaccuracies of classification for the data instances;
   training the model using respective subsets of training data over the multiple iterations to generate a trained model, weightings of instances of the respective subsets determined using respective loss gradients from the set of loss gradients;
   applying regularization during the training to avoid overfitting of the model to the set of training data;
   evaluating the trained model using a subset of evaluation data, selected from the set of training data, that was not included in the respective subsets used for the training; and
   providing the trained model for use in classifying unclassified data.

2. The computer-implemented method of claim 1, further comprising:
   determining a problem to be solved using the model; and
   selecting a type of model based at least in part upon the problem to be solved, the type of model including one of an artificial neural network, deep learning algorithm, learning classifier, or Bayesian network.

3. The computer-implemented method of claim 1, further comprising:
   specifying a training parameter for the training, the training parameter including one of maximum model size, maximum number of passes over training data, shuffle type, regularization type, learning rate, or regularization amount.

4. The computer-implemented method of claim 1, further comprising:
   obtaining a set of classified data;
   shuffling the set of classified data to generate a random ordering of instances of data in the set;
   allocating a first subset of the classified data as the set of training data; and
   allocating a second subset of the classified data as the set of evaluation data.

5. The computer-implemented method of claim 1, further comprising:
   selecting a logistic regression algorithm for performing learning of the neural network.

6. The computer-implemented method of claim 1, further comprising:
   performing pre-processing of the set of training data, the pre-processing including determining a proper classification provided for each data instance of the set.

7. The computer-implemented method of claim 1, further comprising:
   processing instances of the subset of training data for a respective iteration in parallel using cores of one or more graphics processing units (GPUs).

8. The computer-implemented method of claim 1, further comprising:
   specifying a maximum number of data instances to be selected for each iteration of the training.

9. The computer-implemented method of claim 1, further comprising:
   determining a number of the iterations for the training using at least one of a maximum number of iterations or satisfaction of a convergence criterion for the model.

10. A system, comprising:
    at least one processor; and
    a memory including instructions that, when executed by the at least one processor, cause the system to:
    obtain a set of training data for training a model, the training including multiple iterations, the set of training data including data instances each having a specified classification;
    select, for a respective iteration of the training, a subset of the training data to use for the training, selection probabilities for instances of the set of training data being higher for instances having lower accuracies of classification as determined using a set of loss gradients for the instances of the set of training data, the subset of the training data selected using a probabilistic sampling algorithm accepting the loss gradients for the data instances of the set, the loss gradients derived from loss values representing a measure of inaccuracies of classification for the data instances;
    train the model using respective subsets of training data over the multiple iterations to generate a trained model, weightings of instances of the respective subsets determined using respective loss gradients from the set of loss gradients;
    applying regularization during the training to avoid overfitting of the model to the set of training data,
    evaluate the trained model using a subset of evaluation data, selected from the set of training data, that was not included in the respective subsets used for the training; and
    provide the trained model for use in classifying unclassified data.

11. The system of claim 10, wherein the instructions when executed further cause the system to:
    determine a problem to be solved using the model; and
    select a type of model based at least in part upon the problem to be solved, the type of model including one of an artificial neural network, deep learning algorithm, learning classifier, or Bayesian network.

12. The system of claim 10, wherein the instructions when executed further cause the system to:
    specify a training parameter for the training, the training parameter including one of maximum model size, maximum number of passes over training data, shuffle type, regularization type, learning rate, or regularization amount.

13. The system of claim 10, wherein the instructions when executed further cause the system to:
    obtain a set of classified data;
    shuffle the set of classified data to generate a random ordering of instances of data in the set;
    allocate a first subset of the classified data as the set of training data; and allocate a second subset of the classified data as the set of evaluation data.

14. A non-transitory computer-readable storage medium storing instructions that, when executed by a processor of a computing device, cause the computing device to:
- obtain a set of training data for training a model, the training including multiple iterations, the set of training data including data instances each having a specified classification;
- select, for a respective iteration of the training, the subset of the training data selected using a probabilistic sampling algorithm accepting the loss gradients for the data instances of the set, the loss gradients derived from loss values representing a measure of inaccuracies of classification for the data instances;
- train the model using respective subsets of training data over the multiple iterations to generate a trained model, weightings of instances of the respective subsets determined using respective loss gradients from the set of loss gradients;
- applying regularization during the training to avoid overfitting of the model to the set of training data;
- evaluate the trained model using a subset of evaluation data, selected from the set of training data, that was not included in the respective subsets used for the training; and
- provide the trained model for use in classifying unclassified data.

15. The non-transitory computer-readable storage medium of claim 14, wherein the instructions when executed further cause the computing device to:
- determine a problem to be solved using the model; and
- select a type of model based at least in part upon the problem to be solved, the type of model including one of an artificial neural network, deep learning algorithm, learning classifier, or Bayesian network.

16. The non-transitory computer-readable storage medium of claim 14, wherein the instructions when executed further cause the computing device to:
- specify a training parameter for the training, the training parameter including one of maximum model size, maximum number of passes over training data, shuffle type, regularization type, learning rate, or regularization amount.

* * * * *